April 6, 1943.  A. GIGLIO  2,315,952
APPARATUS FOR FORMING MEAT LOAF
Filed Nov. 9, 1940
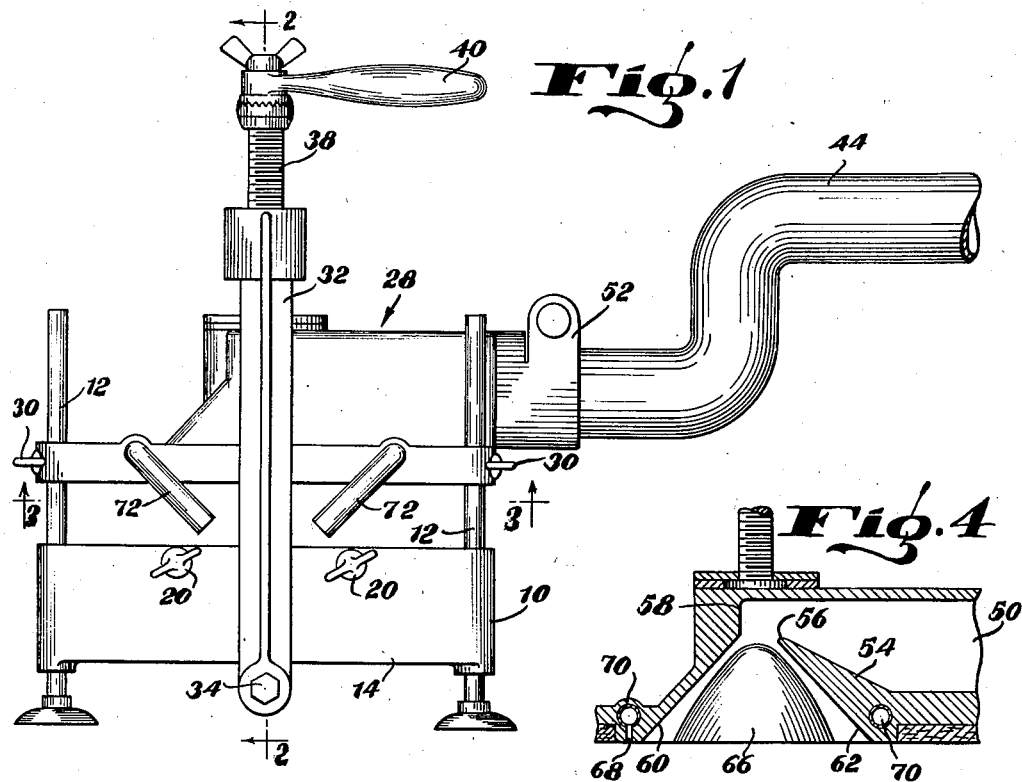
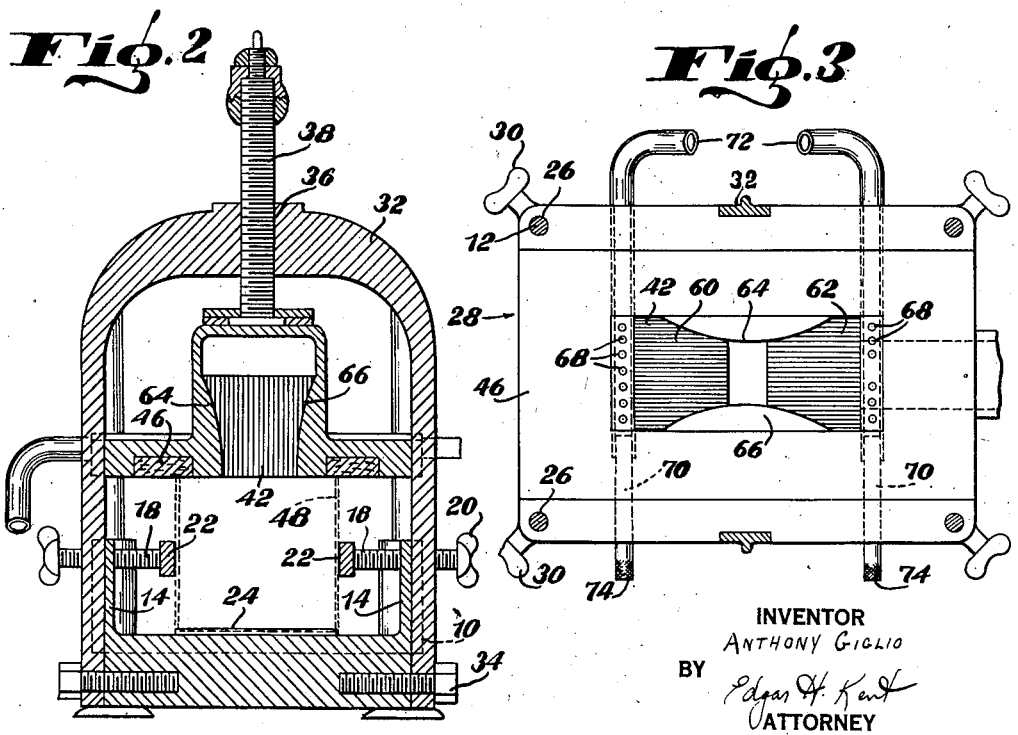
INVENTOR
ANTHONY GIGLIO
BY Edgar H. Kent
ATTORNEY Patented Apr. 6, 1943

2,315,952

UNITED STATES PATENT OFFICE 2,315,952

APPARATUS FOR FORMING MEAT LOAF

Anthony Giglio, Boston, Mass., assignor to Fulton Stuffer Corporation, Boston, Mass., a corporation of Massachusetts Application November 9, 1940, Serial No. 365,059

3 Claims. (Cl. 226—93)

This invention relates to apparatus for forming meat loaf, more particularly to improvements in apparatus of the type shown in co-pending application Serial No. 241,726, filed November 22, 1938.

An object of the invention is to provide apparatus of this type by means of which ground meat may be compressed into loaves of various sizes and shapes of uniform, solid texture which will retain their shape on handling and baking. A further object of the invention is to provide such apparatus which is of inexpensive construction, which may be used to pack molds of various sizes and shapes without change of parts, and which is rapid and economical in operation. These and other objects and advantages of the invention will be apparent from the ensuing more particular description and from the accompanying drawing wherein:

Fig. 1 is a side elevation of apparatus of the invention;

Fig. 2 is a vertical secction on the line 2—2 of Fig. 1, looking in the direction of the arrows;

Fig. 3 is a vertical section on the line 3—3 of Fig. 1, looking in the direction of the arrows;

Fig. 4 is a longitudinal vertical section through a portion of the discharge head shown in Fig. 1.

In the embodiment shown in the accompanying drawing, a mold supporting platform 10 is slidably mounted upon vertical standards or legs 12. Upon opposite sides of the platform 10 are a pair of vertical flanges 14 each having therein a pair of screw threaded apertures through which extend the threaded shanks of a pair of bolts 18. Bolts 18 have fixed upon their outer ends wing nuts 20 by which they may be turned for adjustment through the flanges 14, and each pair of bolts 18 has secured to the inner ends thereof a smooth bar 22 extending over the platform 10 parallel to the adjacent flange 14. Bars 22 constitute guides which bear against the sides of a mold to position it widthwise of the platform and are adjustable for different width molds by means of the bolts 18. Adjacent one end of the platform 10, between the flanges 14, is a raised stop lug 24 adapted to engage the end of a mold to position it longitudinally of the platform, the lug 24 being made adjustable longitudinally of the platform in any convenient manner to accommodate molds of different lengths.

The upper ends of standards 12 are slidably received through bores 26 at the corners of pressure head member 28. Member 28 may be fixed in desired position vertically on the standards 12 by means of wing nuts 30 screw threaded through the corners of member 28 and adapted to enter transversely into the bores 26 to engage the standards 12. Member 28 is slidably embraced between the arms of an inverted yoke 32 which is secured at its lower ends to opposite sides of platform 10, centrally thereof, by means of bolts 34 received in suitable threaded apertures in the platform. In the center of yoke 32 is a threaded aperture 36 through which extends a worm shaft 38 rotatably seated in the top of member 28. The upper end of shaft 38 is provided with a handle 40 by which it may be turned. It will be evident that, when member 28 is fixed in desired position on the standards 12 by means of the wing nuts 30, turning of handle 40 in one direction will raise yoke 32 by means of worm shaft 38 and correspondingly threaded aperture 36, lifting platform 10 toward member 28, and that opposite movement of handle 40 will lower the yoke and platform.

The lower substantially horizontal surface of member 28 is provided centrally thereof with an opening 42 forming the lower end of a meat feeding passage through member 28. The upper end of this passage is connected by means of pipe 44 with a suitable device (not shown) for forcing ground meat into and through pipe 44 under heavy pressure. Upon the lower surface of member 28, surrounding the opening 42, is a flat, yieldable gasket 46, adapted to engage the edges of the open end of a mold 48 positioned on platform 10 and pressed against gasket 46 by raising platform 10.

As so far described, the apparatus of the invention is similar to that disclosed in co-pending application Serial No. 241,726 above referred to. With the apparatus disclosed in that application, however, difficulty has been experienced in securing an evenly packed loaf. It has been found that in loaves packed with said machine, the meat is more heavily packed at the center than at the sides and ends, and that upon baking, the loaves swell undesirably at the center. I have discovered that this difficulty can be obviated and a uniformly hard packed loaf obtained by means of the novel feed passage and pressure release means now to be described.

As best shown in Fig. 4, the upper end of the feed passage through member 28 comprises a substantially horizontal and rectangular duct 50 to the outer end of which pipe 44 is secured in pressure tight relation by means of clamping sleeve 52. At its inner end, the lower wall of duct 50 is sloped upwardly at 54 for a vertical distance of about half the depth of the duct and terminates in an edge 56 above and to one side of the center of opening 42. The upper wall of duct 50 extends beyond edge 56 and beyond the center of opening 42 where it terminates in a vertical wall 58 opposite edge 56 and extending down to the horizontal plane of said edge. Connecting edge 56 and the lower edge of wall 58 with the respective adjacent ends of opening 42 are a pair of oppositely outwardly inclined smooth walls 60 and 62. Connecting these end walls 60 and 62 are a pair of side walls 64 and 66 which are curved inwardly to their center from points adjacent the walls 60 and 62 and which are also sloped inwardly from adjacent edge 56 to the bottom as shown in Figs. 2–4, providing opening 42 with a dumb-bell shaped outline as shown in Fig. 3.

Between each end of opening 42 and gasket 46 is a row of small pressure exhaust ports 68 parallel to the adjacent end of opening 42 and extending substantially the full width of the opening, these ports being about $\frac{1}{8}$ of an inch in diameter. Each port communicates with a larger duct 70 extending horizontally through member 28 above the corresponding row of ports. Each duct 70 terminates at one end in a downwardly curved tube 72 projecting from the side of member 28, and at the opposite end is sealed by a removable clean-out plug 74. As shown, there is one more port 68 in the row adjacent the end of opening 42 opposite the pipe 44 than in the other row for a reason hereinafter explained.

In use, a meat loaf mold, such as the customary open-topped rectangular pan 48, is slid onto platform 10 between previously adjusted guide bars 22 until its end abuts previously adjusted stop lug 24. Platform 10 is then raised by turning worm shaft 38 until the edges of mold 48 are pressed firmly into gasket 46 and are thereby sealed around the edges of opening 42 and beyond the ports 68. Duct 50 is then opened to the source of ground meat under pressure, as by turning a suitable hand valve in pipe 44, and the meat is forced through duct 50, being compressed as it approaches the end of the duct by the upwardly inclined portion 54 of the bottom wall and being expelled with great force from the opening between the end 56 of portion 54 and the top wall of the duct against the opposite vertical wall 58. Thence the meat proceeds downwardly through the restricted horizontal space between wall 58 and edge 56 and thence proceeds downwardly into mold 48 expanding under the pressure lengthwise of the pan as permitted by the sloping walls 60 and 62 and contracting somewhat widthwise of the pan until it reaches the bottom of the walls 64 and 66 when it is permitted to spread sidewide to the edges of the pan.

As the meat is fed into the mold, the air is exhausted from the ends of the mold through ports 68, ducts 70 and tubes 72. Since the meat is fed under heavy pressure, preferably at least 45 pounds per square inch, the exhaustion of air through ports 68 is rapid and creates a flow of air toward the ends of the mold which assists in drawing meat toward the ends of the mold. Since there are more ports 68 at the end opposite pipe 44 than at the opposite end, the suction is slightly greater toward this end with the result that the meat is packed somewhat more firmly at this end than at the other. When the mold is completely packed, air will cease to hiss from the tubes 72 and bits of meat may start to issue therefrom, signaling the operator who turns the valve 76 closing passage 50 to the pressure feed source. Platform 10 is then slightly lowered to release the edges of the packed mold from clamped engagement with gasket 46 and the mold is slid off the end of the platform opposite to stop lug 24. The smooth under surface of the head member 28 and gasket 46 act to smooth off the top of the packed meat in the mold as the mold is slid outwardly thereunder, and also press the meat somewhat toward the far end of the pan increasing the compression slightly at that end. It is for the latter reason that the additional port 68 is provided adjacent the end of the mold nearest the entrance end of the platform, acting, as above explained, to cause a comparatively increased packing at this end by the pressure head, to equalize the increase in packing compression at the opposite end consequent on sliding out the mold.

Loaves packed by the apparatus of the present invention are firm, uniform in texture, and do not swell unevenly or lose their shape on baking. They are far superior in these respects to loaves packed by the apparatus of the prior application Ser. No. 241,726, an improvement which extensive tests have indicated is due both to the shape of the meat distributing passage and to the provision of a number of exhaust ports above each end of the mold as shown and described herein.

It will be apparent that I do not intend to limit the invention to all details of the preferred embodiment described and illustrated, but only as may be required by the appended claims.

I claim:

1. In apparatus for forming meat loaf, the combination of a conduit adapted for connection to a source of ground meat under heavy pressure; a discharge head on the outer end of said conduit having a substantially flat mold-engaging face; a meat discharging and distributing passage extending through said head from said conduit to said face, said passage including a substantially horizontally disposed duct connected at one end to said conduit and decreasing in depth toward a substantially vertical wall forming the opposite end of said duct, an opening through the bottom of said duct adjacent said wall, and a passage extending from said opening through said face of said head having end walls sloping outwardly from adjacent said opening and side walls sloping inwardly centrally from adjacent said opening to provide an elongated, centrally narrowed mouth for said passage in said face of said head; and means to clamp the open end of a mold to said head around the mouth of said passage.

2. In apparatus for forming meat loaf, the combination of a conduit adapted for connection to a source of ground meat under heavy pressure; a discharge head on the outer end of said conduit having a substantially flat mold-engaging face; a meat discharging and distributing passage extending through said head from said conduit to said face, said passage including a substantially horizontally disposed duct connected at one end to said conduit and decreasing in size toward a substantially vertical wall forming the opposite end of said duct, an opening through the bottom of said duct adjacent said wall, and a passage extending from said opening through said face of said head having end walls sloping outwardly from adjacent said opening and side walls sloping inwardly centrally from adjacent said opening to provide an elongated, centrally narrowed mouth for said passage in said face of said head; and means to clamp the open end of a mold to said head around the mouth of said passage.

3. In apparatus for forming meat loaf, the combination of a conduit adapted for connection to a source of ground meat under heavy pressure; a discharge head on the outer end of said conduit having a substantially flat mold-engaging face; a meat discharging and distributing passage extending through said head from said conduit to said face, said passage including a substantially horizontally disposed duct connected at one end to said conduit and decreasing in size toward a substantially vertical wall forming the opposite end of said duct, an opening through the bottom of said duct adjacent said wall, and a passage extending from said opening through said face of said head having end walls sloping outwardly from adjacent said opening and side walls sloping inwardly centrally from adjacent said opening to provide an elongated, centrally narrowed mouth for said passage in said face of said head; a gasket on said face of said head surrounding the mouth of said passage; means to clamp the open end of a mold to the surface of said gasket to form a substantially air tight enclosure around the mouth of said passage; and means to vent air substantially equally from each end of a clamped mold as meat is fed therein through said passage under pressure.

ANTHONY GIGLIO.